US012672033B2

(12) United States Patent
Deng et al.

(10) Patent No.: US 12,672,033 B2
(45) Date of Patent: Jun. 30, 2026

(54) CELL HANDOVER METHOD AND APPARATUS

(71) Applicant: SPREADTRUM COMMUNICATIONS (SHANGHAI) CO., LTD., Shanghai (CN)

(72) Inventors: Yun Deng, Shanghai (CN); Wei Fan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 387 days.

(21) Appl. No.: 17/634,778

(22) PCT Filed: Aug. 10, 2020

(86) PCT No.: PCT/CN2020/108153
§ 371 (c)(1),
(2) Date: Feb. 11, 2022

(87) PCT Pub. No.: WO2021/027770
PCT Pub. Date: Feb. 18, 2021

(65) Prior Publication Data
US 2022/0330113 A1 Oct. 13, 2022

(30) Foreign Application Priority Data
Aug. 15, 2019 (CN) .......................... 201910753442.6

(51) Int. Cl.
*H04W 36/00* (2009.01)
*H04L 5/00* (2006.01)
*H04W 36/36* (2009.01)

(52) U.S. Cl.
CPC ....... *H04W 36/0058* (2018.08); *H04L 5/0053* (2013.01); *H04W 36/362* (2023.05)

(58) Field of Classification Search
CPC ... H04W 36/08; H04W 36/0077; H04W 8/22; H04W 36/00837; H04W 36/0058;
(Continued)

(56) References Cited

U.S. PATENT DOCUMENTS

2012/0014357 A1    1/2012   Jung et al.
2012/0202501 A1*   8/2012   Morioka ........... H04W 36/0072
                                                     455/436
(Continued)

FOREIGN PATENT DOCUMENTS

CN         102404808 A      4/2012
CN         103220711 A      7/2013
(Continued)

OTHER PUBLICATIONS

CMCC, "New SI proposal: Study on air-to-ground network for NR"; 3GPP TSG RAN Meeting #84; RP-191217, Jun. 3-6, 2019, 4 pages.
(Continued)

*Primary Examiner* — Quoc Thai N Vu
(74) *Attorney, Agent, or Firm* — CANTOR COLBURN LLP

(57) ABSTRACT

Cell handover method and apparatus are provided. The method applied to a first base station includes: transmitting a handover request message, wherein the handover request message includes a capacity indication message of a pre-configuration parameter; receiving a handover request acknowledgement message, wherein the handover request acknowledgement message includes the pre-configuration parameter, and a capacity of the pre-configuration parameter is determined based on the capacity indication message; and transmitting a handover command based on the handover request acknowledgement message. The method applied to a second base station includes: receiving a handover request
(Continued)

message, wherein the handover request message includes a capacity indication message of a pre-configuration parameter; generating a handover request acknowledgement message based on the handover request message, wherein the handover request acknowledgement message includes the pre-configuration parameter, and a capacity of the pre-configuration parameter is determined based on the capacity indication message; and transmitting the handover request acknowledgement message.

10 Claims, 4 Drawing Sheets

(58) Field of Classification Search
CPC ............. H04W 36/0005; H04W 36/36; H04W 36/0011; H04L 5/0053
See application file for complete search history.

(56) References Cited

U.S. PATENT DOCUMENTS

| | | | |
|---|---|---|---|
| 2014/0341116 A1 | 11/2014 | Chen et al. | |
| 2019/0239123 A1* | 8/2019 | Kim | H04W 72/0453 |
| 2019/0254050 A1* | 8/2019 | Kusashima | H04W 92/20 |
| 2019/0380066 A1* | 12/2019 | Sharma | H04W 36/14 |
| 2021/0037431 A1* | 2/2021 | Xie | H04W 36/00698 |

FOREIGN PATENT DOCUMENTS

| | | |
|---|---|---|
| CN | 108347750 A | 7/2018 |
| CN | 108882285 A | 11/2018 |
| CN | 110012513 A | 7/2019 |
| CN | 110351801 A | 10/2019 |
| EP | 3432638 A1 | 1/2019 |
| JP | 2013534792 A | 9/2013 |
| WO | 2015168918 A1 | 11/2015 |
| WO | 2018127477 A1 | 7/2018 |
| WO | 2018132051 A1 | 7/2018 |
| WO | 2018156696 A1 | 8/2018 |
| WO | 2018219039 A1 | 12/2018 |

OTHER PUBLICATIONS

International Search Report for International Application No. PCT/CN2020/108153; Date of Mailing, Sep. 28, 2020.
EPO Extended European Search Report for corresponding EP Application No. 20853271.3; Issued on Aug. 29, 2022.
China Telecom, "Running CR for introduction of even further mobility enhancement in E-UTRAN", 3GPP TSG-RAN WG2 #106, R2-1908271, May 13-17, 2019, 14 pages.
CNIPA First Office Action corresponding to CN Application No. 201910753442.6; Mailing Date, Jan. 19, 2021.
JPO Notice of Reason for Refusal corresponding to JP Application No. 2022-508869; Mailing Date, Mar. 14, 2023.
NEC, "Conditional presence of some PDCP parameters in RRC messages", 3GPP TSG-RAN WG2#63bis, Tdoc R2-085461, Sep. 29-Oct. 3, 2008, 3 pages.
NEC, "Email discussion summary [63bis_LTE_B05] Specification of conditional inclusions in handover preparation container", 3GPP TSG-RAN WG2#64, Tdoc R2-086604, Nov. 10-14, 2008, 3 pages.
OPPO, "Discussion on the conditional handover", 3GPP TSG-RAN WG2 Meeting #105, R2-1900859, Feb. 25-Mar. 1, 2019, 5 pages.
EPO European First Office Action for corresponding EP Application No. 20853271.3; Issued Mar. 17, 2025.

* cited by examiner

CELL HANDOVER METHOD AND APPARATUS

CROSS-REFERENCE TO RELATED APPLICATIONS

This is the U.S. national stage of application No. PCT/CN2020/108153, filed on Aug. 10, 2020. Priority under 35 U.S.C. § 119(a) and 35 U.S.C. § 365(b) is claimed from Chinese Application No. 201910753442.6, filed on Aug. 15, 2019, the disclosure of which is also incorporated herein by reference

TECHNICAL FIELD

The present disclosure generally relates to radio communication field, and more particularly, to a cell handover method and apparatus.

BACKGROUND

In a radio communication system, channel handover is required to maintain uninterrupted communication of a User Equipment (UE) when the UE moves from one cell to another, which process is called cell handover.

SUMMARY

Embodiments of the present disclosure provide a cell handover method and apparatus.

In an embodiment of the present disclosure, a cell handover method applied to a first base station is provided, including: transmitting a handover request message, wherein the handover request message includes a capacity indication message of a pre-configuration parameter; receiving a handover request acknowledgement message, wherein the handover request acknowledgement message includes the pre-configuration parameter, and a capacity of the pre-configuration parameter is determined based on the capacity indication message; and transmitting a handover command based on the handover request acknowledgement message.

In an embodiment of the present disclosure, a cell handover method applied to a second base station is provided, including: receiving a handover request message, wherein the handover request message includes a capacity indication message of a pre-configuration parameter; generating a handover request acknowledgement message based on the handover request message, wherein the handover request acknowledgement message includes the pre-configuration parameter, and a capacity of the pre-configuration parameter is determined based on the capacity indication message; and transmitting the handover request acknowledgement message.

In an embodiment of the present disclosure, a cell handover apparatus is provided, including: a processor; and a memory storing processor-executable instructions, wherein the processor is configured to perform the above method.

In an embodiment of the present disclosure, a cell handover apparatus is provided, including: a processor; and a memory storing processor-executable instructions, wherein the processor is configured to perform the above method.

In an embodiment of the present disclosure, a non-volatile computer-readable storage medium having computer instructions stored therein is provided, wherein when the computer instructions are executed by a processor, the above method is performed.

In an embodiment of the present disclosure, a non-volatile computer-readable storage medium having computer instructions stored therein is provided, wherein when the computer instructions are executed by a processor, the above method is performed.

Other features and aspects of the present disclosure are clear based on following detailed description of exemplary embodiments with reference to accompanying drawings.

BRIEF DESCRIPTION OF THE DRAWINGS

The accompanying drawings which are incorporated in and constitute a part of the specification illustrate exemplary embodiments, features and aspects of the disclosure together with the description, and serve to explain principles of the disclosure.

DETAILED DESCRIPTION

Various exemplary embodiments, features and aspects of the present disclosure are described in detail below with reference to the accompanying drawings. The same reference numbers in the accompanying drawings denote elements that have the same or similar functions. While various aspects of the embodiments are shown in the accompanying drawings, the drawings are not necessarily drawn to scale unless indicated.

The word "exemplary" used exclusively herein means "serving as an example, embodiment or illustration". Any embodiment described herein as "exemplary" is not necessarily to be construed as preferred or advantageous over other embodiments.

Further, to better illustrate the present disclosure, more specific details are given in the following detailed description. Those skilled in the art could understand that the present disclosure may be implemented without certain specific details. In some instances, methods, means, components and circuits well known to those skilled in the art have not been described in detail so as not to obscure the subject matter of the present disclosure.

Figure 1:
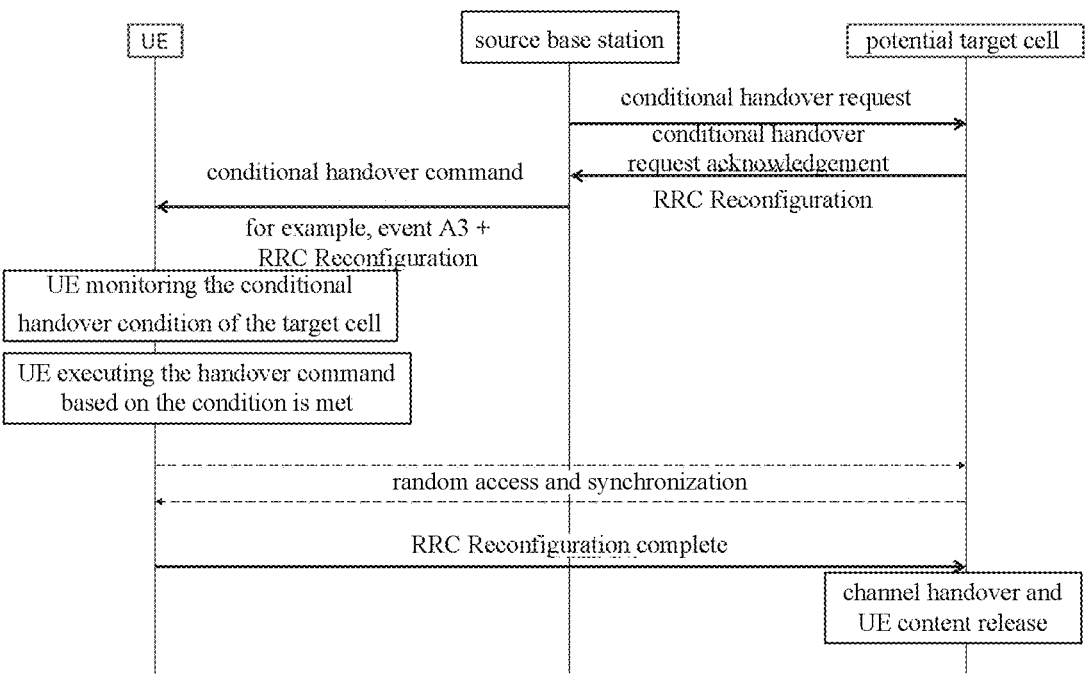
FIG. 1 is a flow chart of conditional handover according to an embodiment.

Based on discussion of the 3rd Generation Partnership Project (3GPP), Conditional Handover (CHO) may be introduced in a cell handover procedure. FIG. 1 is a flow chart of conditional handover according to an embodiment, and the conditional handover is as follows.

From FIG. 1, compared to a conventional cell handover procedure, in the conditional handover procedure, a handover condition (also be referred to as a conditional handover trigger condition in the embodiments of the present disclosure) is included in a conditional handover command (CHO configuration). Specific content of the handover condition is not limited in the embodiments of the present disclosure. For example, the handover condition may include signal quality of potential target cells (potential target nodes) being higher than signal quality of a serving cell by a predetermined offset. In response to receiving the handover command, the UE may determine whether the handover condition is met. If the handover condition is satisfied, the UE may use configuration parameters of the potential target cells included in the handover command to access a target cell. Based on synchronizing with the target cell, the UE initiates a random access procedure in the target cell, and implements the handover to the target cell after transmitting a handover complete command (i.e., RRC reconfiguration is completed). If the handover condition is not met, the UE continues to maintain RRC connection with a source base station (source node). The source base station may configure a plurality of potential target cells and corresponding handover conditions for the UE.

In response to receiving the CHO and finding that the handover condition is not met, the UE continues to maintain the RRC connection with the source cell. During this period, the UE continues to perform measurements based on measurement configuration configured by the source base station, and reports neighbor cells meeting a report condition. The source base station may flexibly adjust the handover conditions or the potential target cells or transmit a handover command for unconditional handover (that is, a conventional handover command, the UE needs to perform the handover immediately based on the command in response to receiving the conventional handover command) based on practical requirements. Therefore, the source base station needs to learn changes of channel environment where the UE is located in real time, so as to make a decision in time to avoid the UE handing over to an inappropriate neighboring cell, such as handing over to a neighboring cell that is not the strongest on a certain frequency. Based on handing over to a non-strongest neighboring cell, the UE's uplink and downlink signal transmission will be affected greatly, and the base station may make determine to perform handover again. The handover procedure may affect a data transmission rate, and thus affect user experience.

Based on the source base station configuring a plurality of potential target cells for the UE, each potential cell configures complete radio parameters for the UE, so that the UE can access the potential cell to carry out services based on radio parameters configured by the cell when determining based on the conditional handover that it can hand over to the potential cell. Therefore, a number of radio parameter bits configured for each potential cell is also large, which is similar to that of a conventional handover command.

However, a capacity of RRC configuration that can be stored in a UE is generally limited. Considering manufacturing cost of the UE, configuring a large storage space is a great waste. In New Radio (NR) communication, a maximum capacity of RRC configuration that the UE needs to support is 45 kBytes.

During a conditional handover, the UE needs to store multiple sets of radio parameter configurations, including radio parameters configured by at least one source serving cell for the UE, and radio parameters configured by each potential cell for the UE. As a number of bits that can be set in conditional handover signaling is not limited, the number of bits contained in a conditional handover command may be too large. After receiving the conditional handover command, the source serving cell cannot transmit it to the UE, and accordingly the UE may not be able to hand over to a most suitable target cell, thereby affecting handover performance of the UE, and even causing a handover failure, which affects user experience.

An embodiment of the present disclosure provides a cell handover method. In the embodiment, a capacity of radio parameters (i.e., RRC configuration) that can be configured by a base station of a potential target cell may be defined in a conditional handover request before the conditional handover request is transmitted by a source base station to the potential target cell. In the embodiment, an upper limit of radio parameters that can be configured by the base station of the target cell can be directly set to 9 kBytes in the conditional handover request. In response to receiving the conditional handover request, the potential target cell may feed back radio parameters configured for the UE in Conditional Handover Request Acknowledgment (CHO Request ACK) returned to the source base station based on settings in the conditional handover request, where a capacity of the radio parameters does not exceed the upper limit of 9 kBytes set in the conditional handover request. In response to receiving the radio parameters fed back by the potential target cell, the source base station may forward the radio parameters to the UE via RRC signaling (such as RRC reconfiguration signaling). As the capacity of the radio parameters does not exceed 9 kBytes, the handover command of this capacity does not cause a capacity of the RRC configuration stored by the UE to exceed the upper limit. Besides, in the case of a plurality of potential target cells, it is not prone to cause loss of RRC configuration of a potential target cell, thereby guaranteeing a normal cell handover procedure, and improving handover performance.

Figure 2:
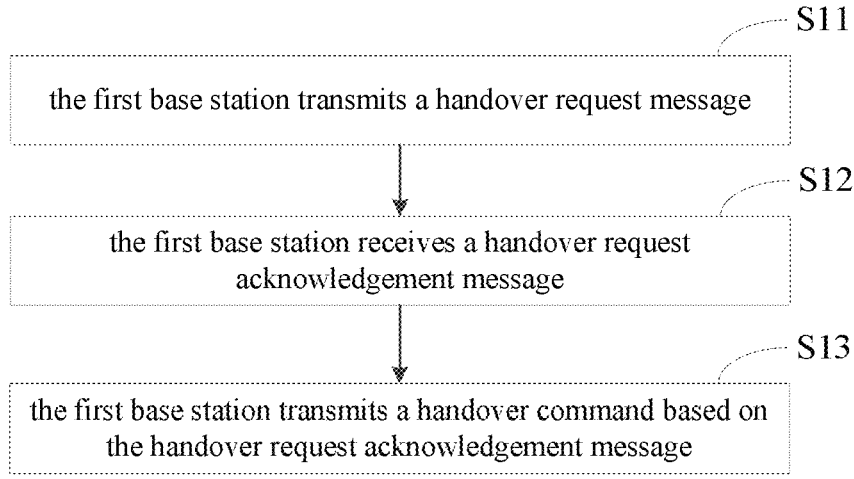
FIG. 2 is a flow chart of a cell handover method according to an embodiment.

FIG. 2 is a flow chart of a cell handover method according to an embodiment. The method may be applied to a first base station, and include S11, S12 and S13.

In S11, the first base station transmits a handover request message, wherein the handover request message includes a capacity indication message of a pre-configuration parameter.

In S12, the first base station receives a handover request acknowledgement message, wherein the handover request acknowledgement message includes the pre-configuration parameter, and a capacity of the pre-configuration parameter is determined based on the capacity indication message.

In S13, the first base station transmits a handover command based on the handover request acknowledgement message.

In some embodiments, the first base station may be a source base station communicating with a UE, and is referred to as a source base station (or a source serving base station). The source base station may manage one or more serving cells, and the UE may be served by one or more cells.

In some embodiments, the first base station may serve as a source base station to communicate with a UE that is to perform cell handover. Further, to implement cell handover, the first base station may also communicate with a second base station. In some embodiments, the second base station may be a serving base station of a cell (i.e., a potential cell) to which the UE may hand over. A number of potential cells is not limited in the embodiments of the present disclosure, and may be one or more which is determined based on practical requirements. As the number of potential cells is not limited, a number of second base stations communicating with the first base station is not limited in the embodiments of the present disclosure, and may be flexibly determined based on practical requirements. Therefore, a specific sending object and sending order of the handover request message in S11 may be flexibly determined based on practical requirements. In some embodiments, the handover request message may be sent to different second base stations simultaneously. In some embodiments, the handover request messages may be sent to different second base stations in a certain order which is flexibly determined based on practical requirements, which is not limited in the embodiments of the present disclosure. Content of the handover request message to the different second base stations may be the same or different, which is flexibly determined based on practical requirements, and the handover request message certainly includes the radio parameters configured by the source base station for the UE.

A method for determining the potential cells may be flexibly selected in the embodiments of the present disclosure. In some embodiments, the method for determining the potential cells may be as follows. The UE accesses a serving cell PCell (a cell under jurisdiction of the first base station and called a primary cell) to establish an RRC connection, and the PCell configures measurement of the serving cell and neighboring cells for the UE, where a specific configuration method is not limited in the embodiments of the present disclosure. In an example, the PCell may configure via RRC signaling that the UE performs measurements on different frequencies. The UE may perform measurements based on the configuration and measurement requirements, and determine whether the neighboring cells meet a report condition configured by the PCell. If the report condition is met, at least one corresponding measurement report may be transmitted to the first base station. In response to receiving the at least one measurement report from the UE, the first base station is triggered to select one or more potential cells based on the received measurement report, where a selection criteria is flexibly determined based on practical requirements, which is not limited in the embodiments of the present disclosure. In some embodiments, one or more cells with a strongest signal measured by the UE on a frequency are selected as the potential cells.

From the above embodiments, in some embodiments, the first base station may determine the potential cells based on the measurement report of the UE, so as to transmit the handover request message to the serving base station (i.e., the second base station) of the potential cell.

Content of the handover request message may be flexibly determined based on practical requirements. From S11, the handover request message may include a capacity indication message of a pre-configuration parameter. The pre-configuration parameter may be a radio parameter configured by the second base station for the UE to be handed over, which may also be flexibly determined based on practical requirements. In some embodiments, the pre-configuration parameter may include parameters corresponding to each radio bearer, configuration measurement parameters, and configuration random access parameters which are allocated to the UE by the second base station. In the case of multiple second base stations, specific content of the pre-configuration parameters of the different second base stations may be flexibly determined based on practical requirements, which is not limited in the embodiments of the present disclosure. As the pre-configuration parameters may include different contents, the pre-configuration parameters corresponding to different second base stations may have different capacities (that is, a number of bits contained in the pre-configuration parameters). Therefore, the capacity indication message of the pre-configuration parameters provided in the embodiments of the present disclosure can be used to limit the number of bits of each pre-configuration parameter. As proposed in the above embodiments, the handover request messages between different second base stations may be the same or different. Therefore, the capacity indication message included in the handover request message for different second base stations may include the same content or different content, which may be flexibly determined based on practical requirements.

Content of the capacity indication message may be flexibly determined based on practical requirements. In some embodiments, the capacity indication message may include: a limited range of number of bits, wherein the limited range of number of bits indicates a range of a number of bits of the capacity of the pre-configuration parameter; or a number of potential cells, wherein a capacity range of the pre-configuration parameter is determined based on the number of potential cells.

From above, in some embodiments, the capacity indication message may include a limited range of number of bits. By directly setting the range of the number of bits in the capacity indication message, the number of bits of the pre-configuration parameter is limited to not exceed the range of the number of bits, thereby realizing a capacity limitation of the pre-configuration parameter. Specific content of the limited range of the number of bits is not limited in the embodiments of the present disclosure, and may be flexibly determined based on practical requirements. In some embodiments, an upper limit of the number of bits of the pre-configuration parameter may be set to 9 kBytes, 8 kBytes, or 7 kBytes.

Alternatively, in some embodiments, the capacity indication message may include a number of potential cells. By indicating the number of potential cells expected by the first base station in the capacity indication message, the second base station may calculate the capacity range of the pre-configuration parameter based on the number of potential cells and the content in the handover request message. The calculation process is not limited in the embodiments of the present disclosure, may be referred to subsequent embodiments where the second base station is taken as the main subject, and is not described in detail here.

By the capacity indication message, the number of bits of the pre-configuration parameter may be effectively limited, so that a capacity of the handover command sent to the UE may be effectively reduced, and further the total handover command is prevented from exceeding a configuration limit of the UE, which enables the UE to receive handover commands (including conditional handover commands and conventional handover commands) from multiple potential target cells as much as possible to ensure normal cell handover and improve handover performance. Besides, the capacity indication message in different forms such as the limited range of the number of bits or the number of potential cells may increase flexibility of the capacity limitation of the pre-configuration parameters, improve flexibility of handover, and expand an application scope of handover.

In addition to the capacity indication message, the handover request message may further include other contents. In some embodiments, the handover request message further includes a current configuration parameter, and/or a handover trigger condition.

In some embodiments, the current configuration parameter may include a radio parameter configured by the first base station for the UE to perform current communication, which may be flexibly determined based on practical requirements. In some embodiments, the current configuration parameter may include a configuration parameter of a signaling radio bearer or a configuration parameter of a data radio bearer.

The handover trigger condition may be a trigger condition for cell handover set by the first base station for the UE. The cell handover of the UE may be a conditional handover procedure including a handover trigger condition or a conventional handover procedure not including a handover trigger condition. A main difference between the conditional handover procedure and the conventional handover procedure lies in that a handover trigger condition is added in the conditional handover procedure. For feeding back a handover request acknowledgement message to the first base station, the second base station may refer to the handover trigger condition to generate a corresponding pre-configuration parameter. In response to receiving the handover command from the first base station, the UE may determine whether the handover trigger condition is met. Based on the handover trigger condition being met, the UE hands over to the potential cell that meets the handover trigger condition, or based on the handover trigger condition being not met, the UE still maintains communication with the first base station. If multiple potential cells meet the handover trigger condition, the UE may randomly select one potential cell for handover, or select one potential cell based on parameters such as signal quality. However, as the conventional handover procedure does not include the handover trigger condition, the second base station does not refer to the handover trigger condition for feeding back the handover request acknowledgement message to the first base station, and the UE directly hands over to a corresponding cell in response to receiving the handover command, without determining whether a condition is met.

From above, specific content of the handover trigger condition may be flexibly determined based on practical requirements. In some embodiments, the handover trigger condition may be signal quality of the potential cell exceeding a preset threshold, or signal quality of the potential cell being higher than signal quality of a current serving cell PCell by a preset offset, which is not limited in the embodiments of the present disclosure.

As the cell handover may be a conditional handover including a handover trigger condition, or a conventional handover not including a handover trigger condition. In some embodiments, S11 may include: transmitting a handover request message including the capacity indication message and a current configuration parameter; and/or transmitting a conditional handover request message including the capacity indication message, a current configuration parameter, and a handover trigger condition.

From above, regarding the transmission of the handover request message, the UE may transmit the conditional handover request message o all candidate cells to implement the conditional handover among all the potential cells. Alternatively, the UE may transmit the handover request message not including the handover trigger condition to all potential cells to implement the conventional handover among all the potential cells. Alternatively, the UE may transmit the conditional handover request message to some potential cells, and transmit the ordinary handover request message (i.e., not including the handover trigger condition) to remaining potential cells, so as to flexibly implement a mixed mode of the conditional handover and the conventional handover based on practical requirements.

In response to receiving the handover request message via S11, the second base station may generate a handover request acknowledgement message based on the handover request message, and feed back the handover request acknowledgement message to the first base station. A generation process of the handover request acknowledgement message by the second base station may be referred to subsequent embodiments where the second base station is taken as the main subject, and is not described in detail here. Accordingly, the first base station receives the handover request acknowledgement message fed back by the second base station in S12, so as to prepare for subsequent transmission of the handover command which may be performed via RRC reconfiguration signaling. RRC reconfiguration signaling including a pre-configuration parameter configured by a potential cell is the handover command. For example, RRC reconfiguration signaling including a pre-configuration parameter configured by a target cell in a conventional handover procedure is a conventional handover command, and RRC reconfiguration signaling including a pre-configuration parameter configured by a potential cell in a conditional handover procedure and a handover trigger condition corresponding to the potential cell is a conditional handover command.

As mentioned above, in S12, the received handover request acknowledgement message includes the pre-configuration parameter, and the capacity of the pre-configuration parameter is determined based on the capacity indication message which may include a limited range of bits or a number of potential cells. Therefore, said the capacity of the pre-configuration parameter being determined based on the capacity indication message includes: the capacity of the pre-configuration parameter not exceeding the limited range of number of bits; or the capacity of the pre-configuration parameter not exceeding the capacity range determined based on the number of potential cells. That is, based on the capacity indication message being a limited range of bits, the capacity of the pre-configuration parameter may be determined according to the range of bits, so that the number of bits of the pre-configuration parameter does not exceed the limited range of bits. Based on the capacity indication message being the number of potential cells, the capacity of the pre-configuration parameter may be referred to the capacity range of the pre-configuration parameter calculated by the second base station based on the number of potential cells, so that the number of bits of the pre-configuration parameter does not exceed that limited by the calculation result.

By setting the capacity of the pre-configuration parameter not to exceed the limited range of the number of bits or the capacity range determined by the number of potential cells, the potential cells may be enabled to configure radio parameters for the UE within a limited range, so that the UE can receive conditional handover commands or conventional handover commands from multiple potential cells simultaneously, and also can receive a handover command with a capacity limit from the source base station in a case of limited signaling buffer after receiving one or more handover commands, which prevents the number of bits of the handover command from exceeding the limit of the signaling buffer which is available to the UE. Therefore, timeliness of transmitting the handover command to the UE is improved, which helps to guarantee high performance of cell handover.

In response to receiving the handover request acknowledgement message in S12, a handover command may be transmitted in S13 based on the handover request acknowledgement message. From the above embodiments, in S13, the first base station may transmit the handover command to the UE. In embodiments of the present disclosure, an implementation way of S13 may be flexibly determined based on practical requirements. In some embodiments, S13 may include S131 and S132.

In S131, the UE obtains the pre-configuration parameter based on the handover request acknowledgement message.

In S132, the UE transmits the handover command including the pre-configuration parameter via RRC signaling.

Specific content of the handover command is not limited in the embodiments of the present disclosure, and may be flexibly selected based on practical requirements. In addition to the pre-configuration parameter proposed in the above embodiments, the handover command may further include handover indication, a handover object, and a handover trigger condition.

An implementation way of S131 may be flexibly determined based on practical requirements. As mentioned in the above embodiments, the handover request acknowledgement message fed back by the second base station to the first base station includes the pre-configuration parameter configured by the second base station for the UE. Therefore, the first base station can directly obtain the pre-configuration parameter by reading the handover request acknowledgement message. In some embodiments, the pre-configuration parameter configured by the second base station for the UE may be stored in an RRC container, and the first base station directly obtains the pre-configuration parameter configured by the second base station for the UE from the RRC container in the handover request acknowledgement message, and directly forwards the pre-configuration parameter to the UE as a part of the handover command without analyzing the parameter.

An implementation way of S132 may also be flexibly determined based on practical requirements. There are various ways to transmit the handover command including the pre-configuration parameter via RRC signaling. In some embodiments, the RRC signaling may include a pre-configuration parameter of at least one potential cell, that is, the RRC signaling may include merely a pre-configuration parameter of one potential cell, or pre-configuration parameters of two or more potential cells. Therefore, in some embodiments, the pre-configuration parameters configured for the UE by multiple second base stations may be transmitted to the UE via one piece of RRC signaling (such as RRC configuration signaling). In some embodiments, the pre-configuration parameters configured for the UE by multiple second base stations may be transmitted to the UE via two or more pieces of RRC signaling, respectively. In some embodiments, the handover trigger condition of the potential cell corresponding to each pre-configuration parameter may be also indicated in the RRC signaling which carries the pre-configuration parameters.

From above, the handover command including the pre-configuration parameter of at least one potential cell is transmitted to the UE via RRC signaling, and whether one piece of RRC signaling or two or more pieces of RRC signaling is adopted for the transmission is flexibly determined based on a specific situation of the potential cell, which improves flexibility and selectivity of the cell handover.

In response to receiving from the first base station the handover command, the UE may perform cell handover. A specific handover procedure is not limited in the embodiments of the present disclosure, and may be flexibly selected based on practical requirements. In some embodiments, the first base station may transmit a conditional handover command CHO to the UE, that is, the handover command transmitted by the first base station includes a handover trigger condition. After receiving the CHO, the UE may determine whether the potential cell meets the handover trigger condition. Based on the handover trigger condition being met, the UE accesses a target cell using a configuration parameter of the potential target cell contained in the CHO, synchronizes with the target cell, and initiates a random access procedure in the target cell. The UE implements handover to the target cell after transmitting a handover completion command (i.e., RRC reconfiguration completes). Based on the handover trigger condition being not met, the UE continues to maintain RRC connection with the first base station. It should be noted that the UE can continue to maintain the RRC connection with the first base station after receiving the CHO and prior to the completion of the cell handover. During this period, the UE continues to perform measurement based on measurement configuration configured by the first base station, and reports neighbor cells meeting a report condition. The first base station may adjust the handover trigger condition, adjust the potential cell, or transmit the handover command for unconditional handover (i.e., a conventional handover command, the UE needs to immediately perform handover after receiving the conventional handover command) at any time based on practical requirements. Therefore, the first base station needs to grasp changes of channel environment where the UE is located in real time, so as to make a decision in time to prevent the UE from handing over to an unsuitable neighboring cell, such as a neighboring cell that is not the strongest on a certain frequency. Handover to an unsuitable neighboring cell may cause great interference to the UE's uplink and downlink signal transmission, and the base station may make a decision of handover again, thereby affecting a data transmission rate and further affecting user experience. In some embodiments, after the UE receives one or more conditional handover commands and before the cell handover is completed, available RRC buffer for the UE is quite limited. In this case, based on the first base station determining to use the conventional handover, for example, transmitting a handover request to another target base station, a number of bits of the radio parameter that can be configured by the target base station also needs to be set in the handover request, so that the first base station can transmit the handover command to the UE immediately after receiving the conventional handover command fed back by the target base station, which prevents the number of bits of the handover command from exceeding the available RRC buffer of the UE, thereby guaranteeing timely transmission of the handover command and high handover performance.

Figure 3:
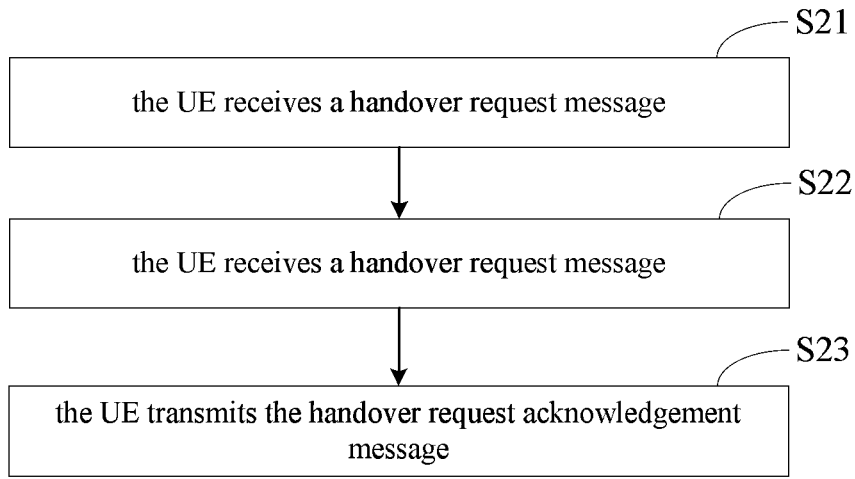
FIG. 3 is a flow chart of a cell handover method according to an embodiment.

The cell handover method with the first base station as an execution object is described in the above embodiments. As mentioned above, the complete procedure of the cell handover needs support from the second base station. Accordingly, FIG. 3 is a flow chart of a cell handover method according to an embodiment. The method may be applied to the second base station, and include S21, S22 and S23.

In S21, the UE receives a handover request message, wherein the handover request message includes a capacity indication message of a pre-configuration parameter.

In S22, the UE generates a handover request acknowledgement message based on the handover request message, wherein the handover request acknowledgement message includes the pre-configuration parameter, and a capacity of the pre-configuration parameter is determined based on the capacity indication message.

In S23, the UE transmits the handover request acknowledgement message.

Specific content of the handover request message in S21 may be referred to the above embodiments, and is not described in detail here. After receiving the handover request message, the second base station may determine whether it is capable of accepting the handover request based on its own load capacity and other conditions. If being capable of accepting, the second base station may generate a handover request acknowledgement message in S22. If being incapable of accepting, the second base station may feedback a rejection of the handover request to the first base station.

An implementation manner of S22 may be flexibly determined based on practical requirements. In some embodiments, S22 may include S221, S222 and S223.

In S221, the second base station determines a capacity range of the pre-configuration parameter based on the capacity indication message.

In S222, the second base station generates the pre-configuration parameter based on the capacity range of the pre-configuration parameter, wherein the capacity of the pre-configuration parameter does not exceed the capacity range.

In S223, the second base station generates a handover request acknowledgement message including the pre-configuration parameter.

As mentioned in the above embodiments, the capacity indication message includes a limited range of number of bits or a number of potential cells. Different forms of the capacity indication message have different manners of determining the capacity range of the pre-configuration parameter. In some embodiments, S221 may include: determining the limited range of number of bits as the capacity range of the pre-configuration parameter; or calculating the capacity range of the pre-configuration parameter based on the number of potential cells and the handover request message.

Specific implementation of determining the limited range of number of bits as the capacity range of the pre-configuration parameter may be referred to the above embodiments, and is not described in detail here. A detailed process of calculating the capacity range of the pre-configuration parameter based on the number of potential cells and the handover request message may be determined based on practical requirements. In some embodiments, the process may include S2211, S2212 and S2213.

In S2211, the second base station obtains a capacity of the current configuration parameter based on the handover request message.

In S2212, the second base station determines a maximum capacity of the pre-configuration parameter based on the capacity of the current configuration parameter.

In S2213, the second base station determines the capacity range of the pre-configuration parameter based on a ratio of the maximum capacity to the number of potential cells.

As mentioned in the above embodiments, the handover request message may include relevant content of the current configuration parameter, and thus the capacity of the current configuration parameter can be learned through the handover request message. Further, the maximum capacity of the pre-configuration parameter may be determined in S2212. In some embodiments, the maximum capacity of the pre-configuration parameter is the remaining capacity for configuration parameter that can be provided in the UE. For example, it is generally specified in NR that a capacity of maximum RRC configuration that a UE needs to support is 45 kBytes. Therefore, after learning the capacity of the current configuration parameter in the UE (herein, the capacity is denoted as R1), the remaining capacity that can be provided in the UE is $(45-R1)$kBytes, that is, $(45-R1)$ is the maximum capacity of the pre-configuration parameter.

As there may be multiple potential cells, if the maximum capacity of the pre-configuration parameter is directly used as the capacity range of the pre-configuration parameter, one pre-configuration parameter may occupy all the configuration space of the UE. Therefore, S2213 may be further performed to determine the capacity range of the pre-configuration parameter based on the ratio of the maximum capacity to the number of potential cells. Specific implementation of S2213 may be flexibly determined based on practical requirements. In some embodiments, the number of potential cells is denoted as C. In some embodiments, the maximum capacity of the pre-configuration parameter is divided by the number of potential cells to obtain an average capacity of each pre-configuration parameter which serves as an upper limit of the capacity range, that is, $(45-R1)/C$ serves as the upper limit of the capacity of the pre-configuration parameter. In some embodiments, the first base station may transmit a conventional handover command to the UE. In this case, in addition to the number of potential cells, it is also necessary to consider the conventional handover command. Therefore, an average capacity of each pre-configuration parameter may be obtained by dividing the maximum capacity of the pre-configuration parameter by the number of potential cells plus one, and serves as the upper limit of the capacity range, that is, $(45-R1)/(C+1)$ serves as the upper limit of the capacity of the pre-configuration parameter. In some embodiments, more bits may be reserved for the conventional handover command. Therefore, a certain number of bits may be further subtracted from the calculation result in the above embodiments to obtain the upper limit of the capacity of the pre-configuration parameter, where the number of bits is not limited. For example, the capacity indication message may indicate that the number of potential cells is 3, and the handover request message may indicate that the capacity of the current configuration parameter RRC configuration configured by the first base station is 9 kBytes. As the upper limit of the capacity of RRC configuration of the UE in NR is 45 kBytes, the maximum capacity of the pre-configuration parameter that can be configured for each potential cell is $(45-9=36)$kBytes. Considering that the first base station may transmit a conventional handover command to the UE, the second base station may determine that the upper limit of the capacity of the pre-configuration parameter that can be configured for the UE is $(36/(3+1)=9)$kBytes. If more bits are reserved for the conventional handover command, the second base station may determine that the upper limit of the capacity of the pre-configuration parameter is 8 kBytes or 7 kBytes.

By determining the capacity range of the pre-configuration parameter based on the number of potential cells, the finally determined capacity range is determined flexibly based on practical communication situation of the UE, which is more indicative, and further reduces possibility that the RRC configuration of the UE exceeds the upper limit of the capacity, so as to ensure timeliness and stability of cell handover.

Figure 4:
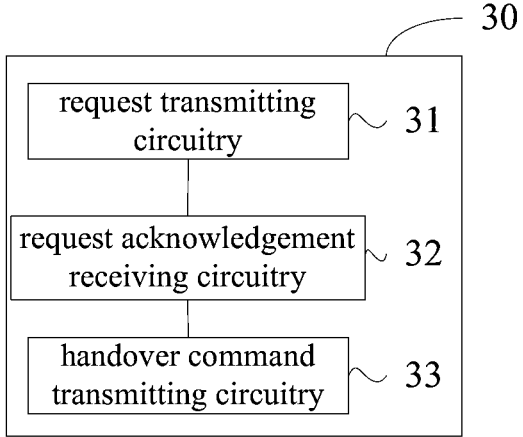
FIG. 4 is a block diagram of a cell handover apparatus according to an embodiment.

FIG. 4 is a block diagram of a cell handover apparatus according to an embodiment. The apparatus 30 includes: a request transmitting circuitry 31 configured to transmit a handover request message, wherein the handover request message includes a capacity indication message of a pre-configuration parameter; a request acknowledgement receiving circuitry 32 configured to receive a handover request acknowledgement message, wherein the handover request acknowledgement message includes the pre-configuration parameter, and a capacity of the pre-configuration parameter is determined based on the capacity indication message; and a handover command transmitting circuitry 33 configured to transmit a handover command based on the handover request acknowledgement message.

In some embodiments, the request transmitting circuitry 31 is configured to: transmit a handover request message including the capacity indication message and a current configuration parameter; and/or transmit a conditional handover request message including the capacity indication message, a current configuration parameter, and a handover trigger condition.

In some embodiments, the capacity indication message includes: limited range of number of bits, wherein the limited range of number of bits indicates a range of a number of bits of the capacity of the pre-configuration parameter; or a number of potential cells, wherein a capacity range of the pre-configuration parameter is determined based on the number of potential cells.

In some embodiments, said the capacity of the pre-configuration parameter being determined based on the capacity indication message includes: the capacity of the pre-configuration parameter not exceeding the limited range of number of bits; or the capacity of the pre-configuration parameter not exceeding the capacity range determined based on the number of potential cells.

In some embodiments, the handover command transmitting circuitry 33 is configured to: obtain the pre-configuration parameter based on the handover request acknowledgement message; and transmit the handover command including the pre-configuration parameter via RRC signaling.

In some embodiments, the RRC signaling includes a pre-configuration parameter of at least one potential cell.

Figure 5:
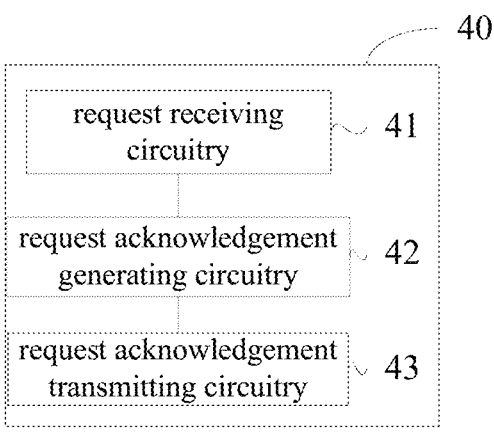
FIG. 5 is a block diagram of a cell handover apparatus according to an embodiment.

FIG. 5 is a block diagram of a cell handover apparatus according to an embodiment. The apparatus 40 includes: a request receiving circuitry 41 configured to receive a handover request message, wherein the handover request message includes a capacity indication message of a pre-configuration parameter; a request acknowledgement generating circuitry 42 configured to generate a handover request acknowledgement message based on the handover request message, wherein the handover request acknowledgement message includes the pre-configuration parameter, and a capacity of the pre-configuration parameter is determined based on the capacity indication message; and a request acknowledgement transmitting circuitry 43 configured to transmit the handover request acknowledgement message.

In some embodiments, the handover request message further includes a current configuration parameter, and/or a handover trigger condition.

In some embodiments, the request acknowledgement generating circuitry 42 includes: a capacity range determination sub-circuitry configured to determine a capacity range of the pre-configuration parameter based on the capacity indication message; a pre-configuration parameter generating sub-circuitry configured to generate the pre-configuration parameter based on the capacity range of the pre-configuration parameter, wherein the capacity of the pre-configuration parameter does not exceed the capacity range; and a request acknowledgement generating sub-circuitry configured to generate a handover request acknowledgement message including the pre-configuration parameter.

In some embodiments, the capacity indication message includes: a limited range of number of bits, wherein the limited range of number of bits indicates a range of a number of bits of the capacity of the pre-configuration parameter; or a number of potential cells, wherein a capacity range of the pre-configuration parameter is determined based on the number of potential cells.

In some embodiments, the capacity range determination sub-circuitry is configured to: determine the limited range of number of bits as the capacity range of the pre-configuration parameter; or calculate the capacity range of the pre-configuration parameter based on the number of potential cells and the handover request message.

In some embodiments, the capacity range determination sub-circuitry is further configured to: obtain a capacity of the current configuration parameter based on the handover request message; determine a maximum capacity of the pre-configuration parameter based on the capacity of the current configuration parameter; and determine the capacity range of the pre-configuration parameter based on a ratio of the maximum capacity to the number of potential cells.

Figure 6:
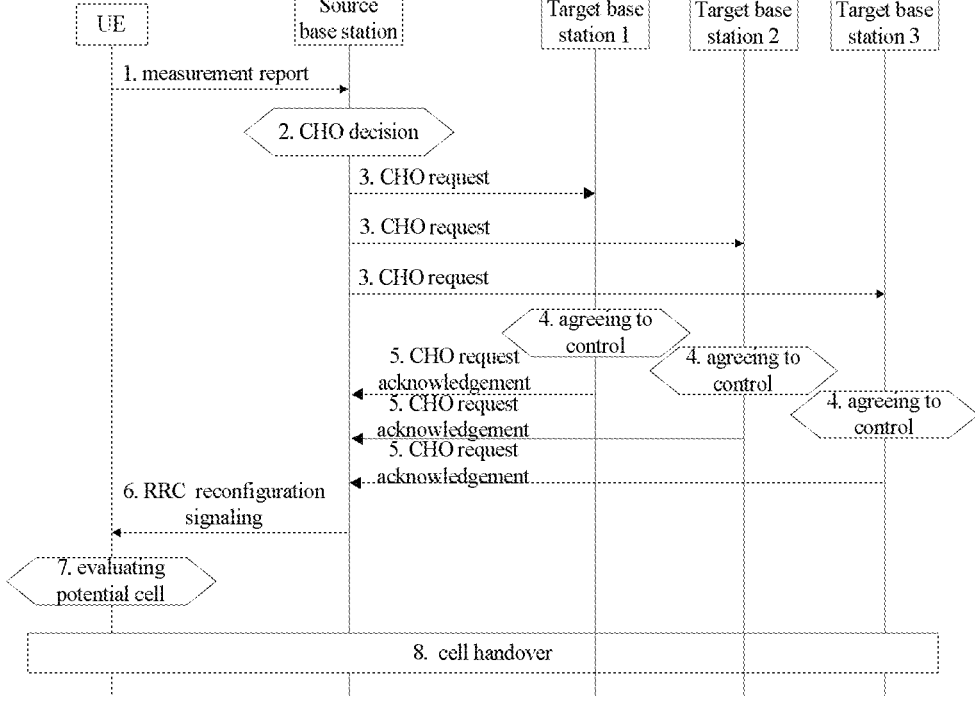
FIG. 6 is an application diagram according to an embodiment.
Figure 7:
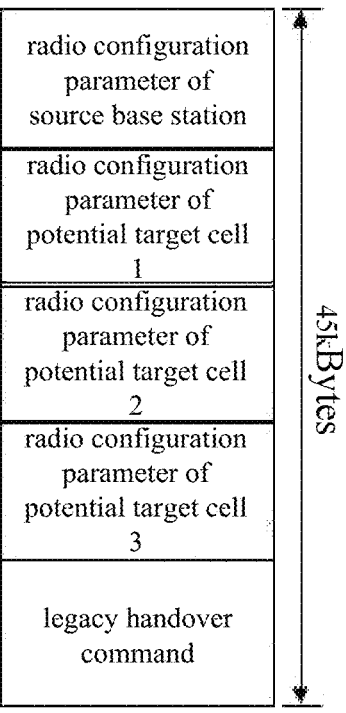
FIG. 7 is an application diagram according to an embodiment.

FIGS. 6 and 7 are application diagrams according to an embodiment. The application diagrams are merely for facilitating understanding but not limiting the embodiment.

Referring to FIG. 6, in the embodiment, a UE communicates with a source base station (also called a serving base station) currently, and accesses a serving cell PCell (a cell under the jurisdiction of the source base station) to establish an RRC connection. PCell configures measurement of serving cell and neighboring cell for the UE. The UE is configured to perform measurement on different frequencies via RRC signaling, performs the measurement based on measurement requirements, and transmits a measurement report to the source base station based on a report condition is met.

During communication service, the UE performs measurement based on measurement configuration configured by the source base station, and reports a corresponding measurement report based on determining that the neighboring cell meets the report condition. After receiving one or more measurement reports from the UE, the source base station may trigger the conditional handover CHO. That is, the source base station may select multiple potential cells, and transmit CHO requests to potential target base stations to which these potential cells belong, where the CHO requests include the current configuration parameter of the UE and the handover trigger condition. The current configuration parameter may include a configuration parameter of a signaling radio bearer or a configuration parameter of a data radio bearer, so that the potential target base station can reasonably configure parameters for the UE.

As shown in the figures, in the embodiment, it is assumed that there are three potential target cells including Cell 1, Cell 2 and Cell 3, respectively belonging to different potential target base stations), which may be located on a same frequency or different frequencies. The source base station may configure for the three potential target cells the same handover trigger condition or different handover trigger conditions. The handover trigger condition may be signal quality of the potential cell exceeding a preset threshold, or signal quality of the potential cell being higher than signal quality of a current serving cell PCell by a preset offset, which is not limited in the embodiments of the present disclosure. A specific procedure of conditional handover is as follows.

In response to receiving the measurement report from the UE, the source base station determines whether to adopt a CHO decision based on current communication situation of the UE and a communication condition of neighboring cells, and determines potential target cells and a corresponding handover trigger condition based on content of the measurement report and strength of signals. Afterward, CHO requests are respectively transmitted to base stations to which the three potential cells belong, where the CHO requests include radio parameters configured by the source base station for the UE and CHO trigger conditions. The source base station may transmit the CHO requests to multiple potential target base stations simultaneously or sequentially.

In response to receiving the CHO request, the potential target base station determines whether to accept the request based on its own load and other conditions. If accepting, the potential target base station allocates radio configuration parameters to the UE, such as parameters corresponding to each radio bearer, measurement parameters or random access parameters. Afterward, the potential target base station returns to the source base station, via an interface with the source base station, a CHO Request Acknowledge which includes the radio configuration parameters allocated by the potential target base station for the UE. The radio parameters configured by the potential target base station for the UE are arranged in an RRC container, where parameters in the RRC container do not need to be parsed by the source base station, and are directly forwarded by the source base station to the UE.

In response to receiving the CHO Request Acknowledge returned by the potential target base station, the source base stations transmit to the UE the radio parameters configured for the UE via one piece of RRC signaling such as RRC Reconfiguration or via multiple pieces of RRC signaling. The source base station may further indicate the conditional handover trigger condition corresponding to each potential cell.

After receiving the radio parameters and the conditional handover trigger conditions, the UE may evaluate the potential cells. Handover is triggered to access the target cell based on the CHO trigger condition being met.

In the embodiment, the upper limit of the capacity of the RRC configuration that the UE can support is 45 kBytes, and it is assumed that the capacity of the radio parameter configured by the source serving cell for the UE, i.e., the capacity of the RRC configuration is 9 kBytes. To prevent a total number of bits of radio parameters configured by the multiple potential cells for the UE from exceeding a storage upper limit of the UE, the capacity of the radio parameter (i.e., the RRC configuration) the potential target base station can configure may be set in the CHO request transmitted by the source base station to the potential target cells. A specific procedure is as follows.

Each potential cell can learn the capacity of the radio parameter configured for the UE by the source serving cell from the CHO request. Therefore, the maximum capacity of the radio parameter (i.e., the RRC configuration) that can be configured by each candidate cell is (45−9=36)kBytes. However, during the conditional handover, after receiving parameters relevant to the conditional handover (also called a conditional handover command), the UE needs to continue to maintain the RRC connection with the source serving cell, and during this period, the source serving cell may transmit to the UE a conventional handover command which also needs to occupy a certain capacity of RRC configuration, such as 12 kBytes. Therefore, each candidate target cell cannot be configured with a relatively large number of bits, such as 36 kBytes. However, even if each candidate target cell configures 15 kBytes of radio parameters for the UE, the total capacity is 45 kBytes. In this case, the source base station cannot transmit the conditional handover command configured by the three potential target cells to the UE. Instead, the UE may select one or two CHO handover commands to transmit to the UE. To avoid this situation, in some embodiments, the upper limit of the capacity of the RRC configuration that is allowed to be configured may be set to, for example, 9 kBytes, or the number of potential target cells expected by the source base station is indicated as 3. After receiving the upper limit or the number, the potential target base station may determine that radio parameters that can be configured for the UE occupy $(36/(3+1)=9)$kBytes based on the capacity of the RRC configuration configured by the source cell being 9 kBytes, the capacity of the RRC configuration available for the UE being 36 kBytes, and the source base station being likely to transmit a conventional handover command to the UE. Alternatively, the potential target base station may consider reserving more bits for the conventional handover command, thus, the upper limit of the capacity of the radio parameters configured for the UE may be 8 kBytes or 7 kBytes. In this manner, the parameters in the RRC buffer in the UE are arranged as shown in FIG. 7. In the embodiment, the RRC buffer of the UE includes the radio configuration parameter of the source base station (Source Cell Config), the radio configuration parameter of the potential target cell Cell1 (Candidate Cell1 Config), the radio configuration parameter of the potential target cell Cell2 (Candidate Cell2 Config), the radio configuration parameter of the potential target cell Cell3 (Candidate Cell3 Config), and a legacy handover command (Legacy HO).

From FIG. 7, by setting the capacity of radio parameter that can be configured by the potential target cells in the conditional handover request, the UE can receive the conditional handover commands of the multiple potential target cells, as well as the possible conventional handover commands. After CHO is applied, that is, after the UE receives one or more conditional handover commands, the available RRC buffer for the UE is very limited. At this time, if the source base station determines to use conventional handover, such as transmitting a handover command to another target base station, the capacity of the radio parameters that can be configured by the target base station also needs to be set in the handover command, so that the source base station can transmit the handover command to the UE immediately after receiving the handover command fed back by the target base station, which prevents the number of bits of the handover command from exceeding the available RRC buffer of the UE, thereby guaranteeing timely transmission of the handover command and high handover performance.

A handover request message including a capacity indication message is transmitted from the first base station to the second base station, a handover request acknowledgement message including a pre-configuration parameter is generated based on the handover request message and transmitted from the second base station to the first base station, where a capacity of the pre-configuration parameter is determined based on the capacity indication message, and a handover command is transmitted to a UE by the first base station based on the handover request acknowledgement message. By the cell handover method and apparatus provided in embodiments of the present disclosure, the capacity of the pre-configuration parameter may be controlled by the capacity indication message, so that the handover command is less likely to exceed a configuration limitation of the UE, and further the UE is enabled to receive handover commands configured by a plurality of potential target cells as much as possible, which guarantees a normal cell handover procedure, and improves handover performance.

Figure 8:
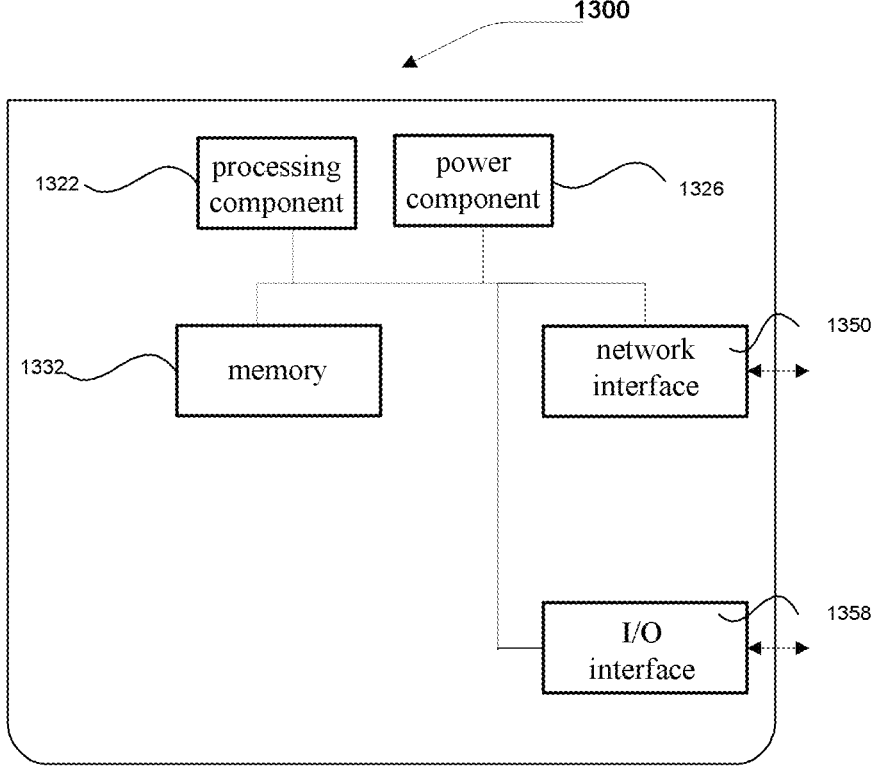
FIG. 8 is a block diagram of a cell handover apparatus according to an embodiment.

FIG. 8 is a block diagram of a cell handover apparatus 1300 according to an embodiment. For example, the apparatus 1300 may be a server. Referring to FIG. 8, the apparatus 1300 includes a processing component 1322 which further includes one or more processors, and a memory resource represented by a memory 1332 configured to store instructions executable by the processing component 1322, such as an application program. The application program stored in the memory 1332 may include one or more modules each of which corresponds to a set of instructions. Further, the processing component 1322 is configured to execute the instructions to perform the above-mentioned methods.

The apparatus 1300 may further include a power component 1326 configured to perform power management of the apparatus 1300, a wired or wireless network interface 1350 configured to connect the apparatus 1300 to a network, and an input and output (I/O) interface 1358. The apparatus 1300 may operate an operating system stored in the memory 1332, such as Windows Server™, Mac OS X™, Unix™, Linux™ or FreeBSD™.

In some embodiments, a non-volatile computer-readable storage medium, such as the memory 1332 including computer program instructions, is also provided. The computer program instructions are executable by the processing component 1322 of the apparatus 1300 to perform the above-mentioned methods.

The present disclosure may be a system, a method and/or a computer program product. The computer program product may include a computer-readable storage medium having computer-readable program instructions stored therein for enabling a processor to implement various aspects of the present disclosure.

The computer-readable storage medium may be a tangible device that can hold and store instructions used by an instruction execution device. The computer-readable storage medium may be, for example, but not limited to, an electric storage device, a magnetic storage device, an optical storage device, an electromagnetic storage device, a semiconductor storage device, or any suitable combination thereof. More specific examples (non-exhaustive list) of computer-readable storage medium include a portable computer disk, a hard disk, a Random Access Memory (RAM), a Read Only Memory (ROM), an Erasable Programmable Read Only Memory (EPROM or a flash memory), a Static Random Access Memory (SRAM), a portable Compact Disk Read Only Memory (CD-ROM), a Digital Versatile Disk (DVD), a memory stick, a floppy disk, a mechanically coded device, a punched card or a bump structure in a groove with instructions stored therein, or any suitable combination thereof. The computer-readable storage media is not a transient signal per se, such as radio waves or other freely propagating electromagnetic waves, electromagnetic waves propagating through waveguides or other transmission media (for example, light pulses through fiber optic cables), or electrical signals transmitted through electrical wires.

The computer-readable program instructions may be downloaded to various computing/processing devices from a computer-readable storage medium, or to an external computer or external storage device over a network such as the Internet, a local area network, a wide area network, and/or a radio network. The network may include copper transmission cables, fiber optic transmission, wireless transmission, routers, firewalls, switches, gateway computers, and/or edge servers. A network adapter card or a network interface in each computing/processing device receives computer-readable program instructions from a network and forwards the computer-readable program instructions for storage in a computer-readable storage medium in each computing/processing device.

Computer program instructions for performing operations of the present disclosure may be assembly instructions, Instruction Set Architecture (ISA) instructions, machine instructions, machine-dependent instructions, microcode, firmware instructions, state setting data, or source code or target code written in any combination of one or more programming languages including object-oriented programming languages, such as Smalltalk or C++, and conventional procedural programming languages, such as C language or similar programming languages. The computer-readable program instructions may be executed entirely on a user's computer, partly on a user's computer, as an independent software package, partly on a user's computer and partly on a remote computer, or entirely on a remote computer or a server. In a case involving a remote computer, the remote computer may be connected to a user's computer through any kind of network including a Local Area Network (LAN) or a Wide Area Network (WAN), or may be connected to an external computer through, for example, the Internet using an Internet service provider). In some embodiments, an electronic circuit, such as a programmable logic circuit, a Field Programmable Gate Array (FPGA), or a Programmable Logic Array (PLA), can be customized by utilizing state information of computer-readable program instructions. The electronic circuit may execute the computer-readable program instructions to realize various aspects of the present disclosure.

Aspects of the present disclosure are described herein with reference to flow charts and/or block diagrams of methods, apparatus (systems) and computer program products according to embodiments of the disclosure. It could be understood that each block in the flow charts and/or block diagrams, and combinations of blocks in the flow charts and/or block diagrams, can be implemented by the computer-readable program instructions.

These computer-readable program instructions may be provided to a processor of a general purpose computer, a special purpose computer or other programmable data processing apparatus to produce a machine which enables generation of devices that realizes functions/actions defined in one or more blocks of the flow charts or the block diagrams when the instructions are executed by the processor of the computer or other programmable data processing apparatus. Alternatively, the computer-readable program instructions may be stored in a computer-readable storage medium, and cause a computer, a programmable data processing apparatus and/or other equipment to operate in a specific manner, so that the computer-readable medium which has instructions stored therein includes a manufactured product including instructions for implementing various aspects of the functions/actions defined in one or more blocks of the flow charts and/or block diagrams.

Alternatively, the computer-readable program instructions may be loaded onto a computer, other programmable data processing apparatus, or other equipment to cause a series of operational steps to be performed on the computer, the other programmable data processing apparatus, or the other equipment to produce a computer-implemented process, thereby causing instructions executed on the computer, the other programmable data processing apparatus, or the other equipment to implement the functions/actions defined in one or more blocks of the flow charts and/or block diagrams.

The flow charts and block diagrams in the figures illustrate an architecture, functions and operations of possible implementations of the systems, methods and computer program products according to various embodiments of the present disclosure. In this regard, each block in the flow charts or block diagrams may represent a module, a program segment, or a portion of instructions which includes executable instructions for implementing specified logical functions. In some embodiments, the functions noted in the blocks may occur out of an order noted in the figures. For example, two successive blocks may be executed substantially concurrently, or in a reverse order, which depends upon functions involved. It also should be noted that each block of the block diagrams and/or flow chart illustrations, and combinations of blocks in the block diagrams and/or flow charts, can be implemented by dedicated hardware-based systems that perform specified functions or actions, or by a combination of dedicated hardware and computer instructions.

Various embodiments of the present disclosure described above are exemplary and not exhaustive, and the present disclosure is not limited thereto. Numerous modifications and variations will be apparent to those skilled in the art without departing from the scope and spirit of the described embodiments. The terminologies used herein are chosen to best explain principles and practical application of the embodiments, improve techniques in the market, or enable those skilled in the art to understand the embodiments disclosed herein.

Various embodiments of the present disclosure described above are exemplary and not exhaustive, and the present disclosure is not limited thereto. Numerous modifications and variations will be apparent to those skilled in the art without departing from the scope and spirit of the described embodiments. The terminologies used herein are chosen to best explain principles and practical application of the embodiments, improve techniques in the market, or enable those skilled in the art to understand the embodiments disclosed herein.

What is claimed is:

1. A cell handover method applied to a source base station, comprising:

transmitting a handover request message to at least one potential target base station, wherein the handover request message comprises an indicator indicating limited range of number of bits;

receiving a handover request acknowledgement message from the at least one potential target base station, wherein the handover request acknowledgement message comprises at least one to-be-configured parameter having a capacity that is configured by the at least one potential target base station based on the limited range of number of bits, and the at least one to-be-configured parameter is used for cell handover of a User Equipment (UE), wherein the capacity of the at least one to-be-configured parameter does not exceed the limited range of number of bits; and transmitting a handover command that comprises the at least one to-be-configured parameter to the UE based on the handover request acknowledgement message.

2. The method according to claim 1, wherein said transmitting the handover request message comprises:

transmitting the handover request message comprising the limited range of number of bits and a current configuration parameter; and/or transmitting the handover request message comprising the limited range of number of bits, a current configuration parameter, and a handover trigger condition.

3. The method according to claim 1, wherein said transmitting the handover command based on the handover request acknowledgement message comprises:

obtaining the at least one to-be-configured parameter based on the handover request acknowledgement message; and transmitting the handover command via Radio Resource Control (RRC) signaling.

4. The method according to claim 3, wherein the RRC signaling comprises at least one to-be-configured parameter of at least one candidate cell.

5. A cell handover method applied to a potential target base station, comprising:

receiving a handover request message from a source base station, wherein the handover request message comprises an indicator indicating limited range of number of bits;

generating a handover request acknowledgement message based on the handover request message, wherein the handover request acknowledgement message comprises at least one to-be-configured parameter used for cell handover of a User Equipment (UE), and a capacity of the at least one to-be-configured parameter does not exceed the limited range of number of bits; and transmitting the handover request acknowledgement message to the source base station.

6. The method according to claim 5, wherein the handover request message further comprises a current configuration parameter, and/or a handover trigger condition.

7. A cell handover apparatus, comprising:

a processor; and a memory storing processor-executable instructions, wherein the processor is configured to:

transmit a handover request message to at least one potential target base station, wherein the handover request message comprises an indicator indicating limited range of number of bits;

receive a handover request acknowledgement message from the at least one potential target base station, wherein the handover request acknowledgement message comprises at least one to-be-configured parameter having a capacity that is configured by the at least one potential target base station based on the limited range of number of bits, and the at least one to-be-configured parameter is used for cell handover of a User Equipment (UE), wherein the capacity of the at least one to-be-configured parameter does not exceed the limited range of number of bits; and transmit a handover command that comprises the at least one to-be-configured parameter to the UE based on the handover request acknowledgement message.

8. A cell handover apparatus, comprising:

a processor; and a memory storing processor-executable instructions, wherein the processor is configured to perform the method of claim 5.

9. A non-volatile computer-readable storage medium having computer instructions stored therein, wherein when the computer instructions are executed by a processor, the method of claim 1 is performed.

10. A non-volatile computer-readable storage medium having computer instructions stored therein, wherein when the computer instructions are executed by a processor, the method of claim 5 is performed.

* * * * *